United States Patent [19]

Upmeier

[11] 4,426,239

[45] Jan. 17, 1984

[54] METHOD OF CONTROLLING THE FILM THICKNESS OF FLAT FILMS PRODUCED IN FLAT FILM EXTRUDER INSTALLATIONS

[76] Inventor: Hartmüt Upmeier, Jahnstrasse 25, 4540 Lengerich of Westphalia, Fed. Rep. of Germany

[21] Appl. No.: 235,618

[22] Filed: Feb. 19, 1981

[30] Foreign Application Priority Data

Feb. 21, 1980 [DE] Fed. Rep. of Germany ....... 3006566

[51] Int. Cl.³ .............................................. B29D 7/02
[52] U.S. Cl. ..................................... 156/64; 73/159; 156/244.11; 156/378; 264/40.1; 425/141; 425/144; 425/145; 427/9
[58] Field of Search .................... 73/159; 156/64, 378, 156/244.11; 264/40.1, 40.2; 425/141, 144, 145; 427/8, 9

[56] References Cited

U.S. PATENT DOCUMENTS 3,307,215 3/1967 Gerhard et al. ................... 425/141
3,767,346 10/1973 Mihalik ........................... 425/461 X
4,246,212 1/1981 Upmeier et al. .................. 264/40.1

FOREIGN PATENT DOCUMENTS 1523629 9/1978 United Kingdom .

Primary Examiner—Robert A. Dawson

[57] ABSTRACT

To achieve a substantially uniform thickness of film extruded from or coated by a sheet die, the thicknesses of the film are measured over its width and the film is sub-divided widthwise into imaginary sections of equal length. Each film section is associated with a correcting section of the sheet die. If the thickness measurement reveals a thick or thin portion in a film section, the associated correcting section is cooled or heated, respectively. The mean thickness distributions are determined from the measurements and employed as a correcting signal for setting elements of the individual correcting sections.

7 Claims, 5 Drawing Figures

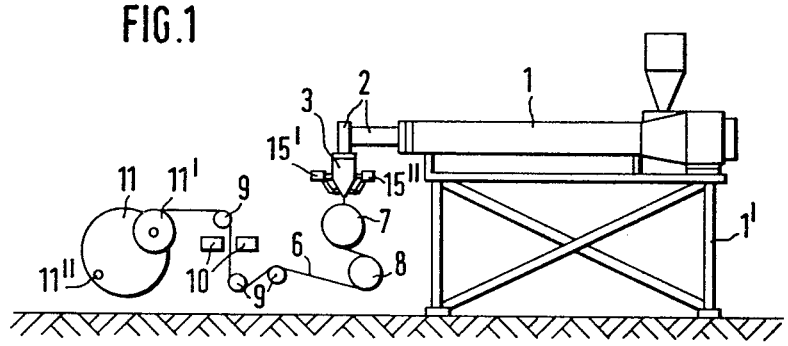
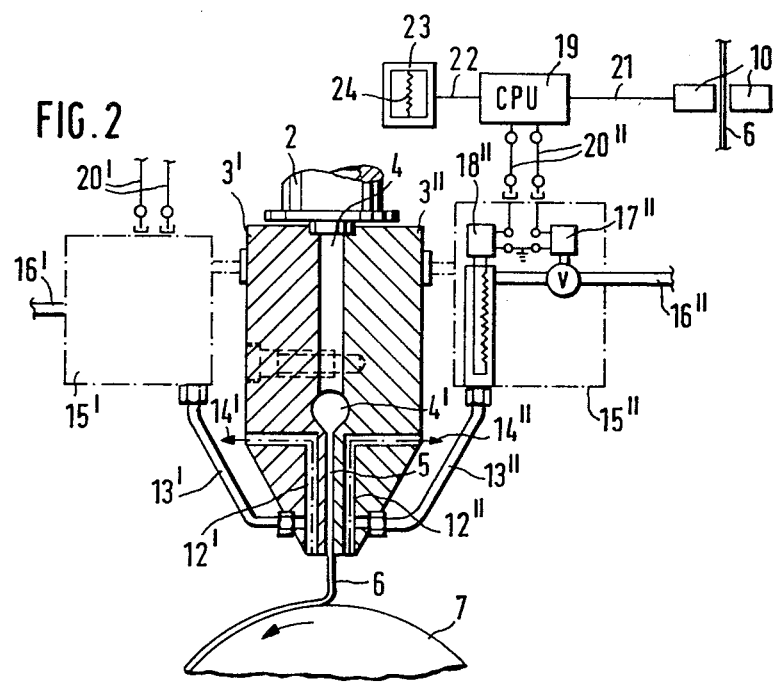

METHOD OF CONTROLLING THE FILM THICKNESS OF FLAT FILMS PRODUCED IN FLAT FILM EXTRUDER INSTALLATIONS

The invention relates to a method of controlling the film thickness of flat films produced in flat film extruder installations or films coated in extruder laminating installations.

Tubular films produced in blown film extruder installations and flat films produced in flat film extruder installations are coiled up into reels after manufacture to enable the films to be stored and to be transported for their further processing. In the production of film, thick and thin portions of the film are usually practically unavoidable and, during coiling, these ar summated to result in film reels having annular beads. This can make subsequent processing of the films difficult or even render it impossible. In the production of blow film, it is known to have a reversing take-off for the flattened film whilst the film bubble is twisted by up to 360° whereby any thick portions in the film are uniformly distributed over the reel in much the same way as coiling a rope. Such a distribution of the thick portions in the film is, however, impossible in the production of flat films in flat film extruders such as those known from DE-OS No. 14 79 979 and DE-OS No. 22 32 459. Consequently, even slightly thicker portions in the film will form pronounced beads or so-called piston rings during coiling of the flat film. These beads affect the planar position and quality of the subsequently nncoiled web very detrimentally.

It is therefore the problem of the present invention to provide a method of controlling the film thickness of flat films or coated films that avoids the formation of thick and thin portions in the film so completely that the flat films may be wound up to form cylindrical coils.

According to the invention, in a method of the aforementioned kind this problem is solved in that the thicknesses are measured over the width of a flat film extruded from or coated by a sheet die and the width of the flat film is sub-divided into equally long sections, that these sections are associated with correcting sections of the sheet die from which they were extruded, said correcting sections being cooled when the measurement of the associated film section shows a thick film portion and being heated when the measurement of the associated film section shows a thin film portion, and that from the measurements the mean thickness distributions are determined over the individual film sections and the values of the mean thickness distributions form a measure for the correcting signal for the setting elements of the individual correcting sections at the sheet die that are associated with the respective film sections. By the method of the invention, depending on the measured thick and thin film portions the associated correcting sections at the sheet die are either heated or cooled or simultaneously heated and cooled, so that thick and thin portions are eliminated by appropriately altering the viscosity of the extruded material and a substantially uniform thickness profile is obtained over the film width.

The controlling method according to the invention can be defined by an algorithm which enables the advantageous use of microprocessors and micro-computers.

In a further embodiment of the invention, the magnitude of the correcting signals is related to the film section with the maximum or minimum thickness in such a way that its associated tempering section receives no correcting signal and the correcting signals for the other tempering sections are formed by the respective departure of the mean thickness distribution of the associated film sections from the extreme reference value of the mean thickness distribution, and that, by reason of the correcting signals corresponding to the departure, the tempering sections are cooled if the extreme reference value is a maximum thickness or heated if the extreme reference value is a minimum thickness. According to this form of the method according to the invention, therefore, there is either heating or cooling of the tempering sections at the sheet die.

Advantageously, according to the mean thickness distributions measured and determined for the individual film sections, an increase and/or reduction in the temperature of the correcting sections at the sheet die can be effected in small steps. By means of this stepwise influence of the correcting sections, the temperature errors which occur in practice can be represented in a permanent positive or negative adjustment of the setting elements.

A flat film extruder installation or an extruder laminating installation for performing the method according to the invention is characterised according to the invention is that in the walls of the sheet die bounding the nozzle opening a number of tempering chambers corresponding to the number of correcting sections is provided, through which a cooling or heating medium can be led. The tempering medium for the individual tempering sections of the sheet die can be air, oil, water or steam.

The sheet die can also be heated in sections by inserting heating cartridges directly into the tempering chambers. To facilitate simple cleaning and accessability of the sheet die, it may be constructed to be parted centrally.

Examples of the invention will now be described in more detail with reference to the drawing, wherein:

FIG. 1 is a diagrammatic side elevation of a flat film extruder installation;

FIG. 2 is a section through a heat die with a diagrammatic indication of the control means influencing the tempering chambers of the sheet die;

Figure 3:
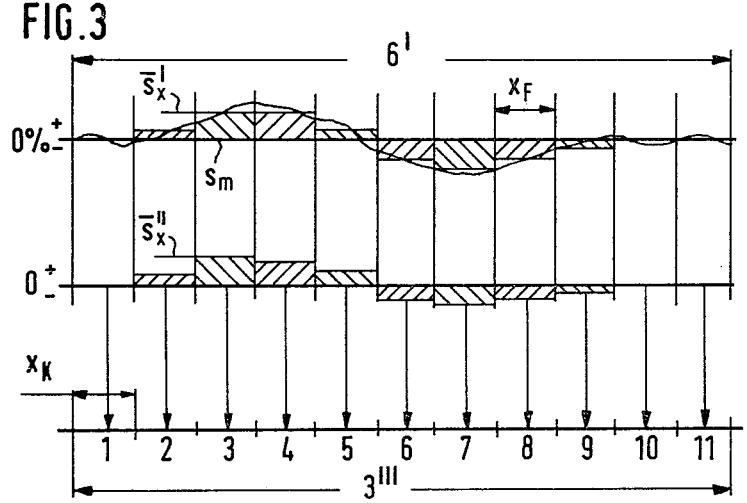
FIG. 3 is a quantitative representation of the allocation of the individual film sections to the tempering sections at the sheet die.

The plastics melt is melted by the extruder 1 mounted on a frame 1' and fed by way of the connecting portions 2 into the sheet die 3 which, by way of the supply passage 4, the distributor passage 4' and the nozzle slot 5, forms the melt into a flat film (or coating foil) 6. The flat film 6 is cooled by the first cooling cylinder 7 and, after passing the second cooling roller 8, led over the guide rollers 9 to the coiler 11 having coiling stations 11', 11" after passing the thickness measuring apparatus 10 which traverses across the web width 6. A web of material that is to be coated could also be passed over the cooling cylinder 7 so as to result in extrusion lamination.

For cleaning purposes, it is suggested to segment the sheet die 3 into housing segments 3', 3". In the vicinity of the nozzle slot 5 and to both sides thereof, provision is made for opposed parallel series of tempering bores 12′, 12″ which, by changing the wall temperatures, influence the stream of melt in these zones and thus also the partial thickness of the web 6 of flat film. The tempering medium, preferably air, is supplied by means of the tubes 13′, 13″ and is led out through the outlet bores 14′, 14″, preferably accumulated and sucked out. The tempering air is fed from the diagrammatically indicated valve/tempering body blocks 15′, 15″ and is supplied from a compressed air supply system (not shown) by means of the pipe conduits 16′, 16″.

The measuring signal of the traversing thickness measuring apparatus 10 is fed by the conductor 21 to the micro-processor 19 (CPU) and is processed. By means of the conductor 22, a thickness recorder 23 may be connected which represents the thickness profile or curve 24 of the flat film or of the extrusion coating 6 in diagram form. Depending on the number of correcting sections $x_K$, measuring sections $x_F$ and the partial mean values $\bar{s}_x'$ are formed from the thickness curve 24. In the upper line of FIG. 3, 6′ represents the total width of the web of film or coating 6.

In the lower line of FIG. 3, 3′ represents the slot width of the nozzle 3 which, because of constriction of the sheet of melt ('neck-in') is generally larger than the width of film 6′. By conversion with the aid of the micro-processor 19, these different widths are brought in registry so that the measured thickness tolerances can be associated directly with the correcting sections.

The correcting elements may be gear motor-actuated set screws, temperature-controlled extension members and, in a particularly advantageous manner, tempering sectors by means of heating and/or cooling, because one can in this way obtain particularly close spacings for the correcting elements.

After setting the extruder installation into operation and reaching thermal equilibrium, positive and negative correcting segment positions are formed in the operating processor portion of the microprocessor 19 having to the size of $s_x''$ according to the first thickness tolerance profile and the partial mean values $s_x'$. Positive values of $s_x''$ are intended to represent thick portions and negative values of $s_x''$ are to represent thin portions. For positive values (thick portions), the sector cooling is brought into effect by quasi-constant volume control with the aid of the magnetic valves controlling the pipe conduits 16′, 16″ (one of which designated 17″ is illustrated in FIG. 2) for negative values (thin portions), the sector heating is brought into effect in so far that, in addition to the magnetic valves, heating elements (one of which designated 18″ is illustrated in FIG. 2) are used to cycle in parallel with the magnetic valves. The magnetic valve and the heating element associated with the tempering body block 15′ receive appropriate signals from the micro-processor 19 via the conduits 20′, while the conduits 20″ feed appropriate signals to the magnetic valve and the heating element associated with the tempering body block 15″. With the valves fully open, the electric voltage of the heating elements is set to be so high that the desired heating temperature of the air is just reached. Upon a reduced volume of flow through cyclic operation of the magnetic valves corresponding to a lower thickness value departure, the heating elements are also switched on for a shorter duration, thereby giving a substantially constant air temperature and the supplied electric heating energy being adapted to the changing air flow. After the measuring heads 10 have traversed for the first time, therefore, the determined thickness tolerance profile 24 (as represented by the values $\bar{s}_x'$); is reproduced in the working processor 19 as analogue valve/heating element positions corresponding to the values $s_x''$ so that the determined thickness error is immediately brought towards O or the desired thickness value $s_m$. Desirably, it is provided that from the stored valve/heating element settings the values $s_x''$ are reduced or increased in small steps according to the subsequently measured thickness tolerance departures so that the temperature errors occurring in practice are represented in a permanent positive or negative valve/heating element position.

It is of course possible to dispense the expensive arrangement of air valve/heating elements in the valve blocks 15′, 15″ by using the principle of only sector heating by inserting heating cartridges directly into the tempering chambers 12′, 12″, or only the principle of sector cooling without the use of heating elements. The principle of sector heating only is applicable particularly for laminating installations by reason of the required high melt temperatures and the principle of sector cooling only is applicable particularly to flat film installations.

Figure 4:
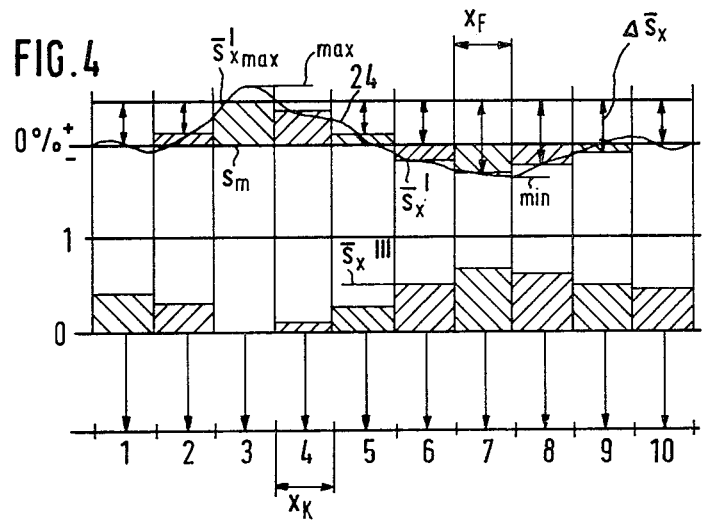
FIG. 4 is a representation corresponding to FIG. 3 only during heating of the correcting sections at the sheet die.
Figure 5:
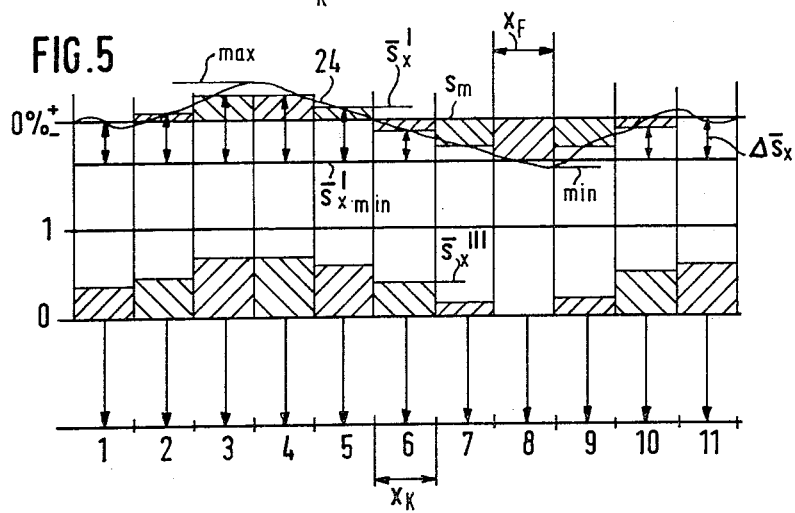
FIG. 5 is a representation corresponding to FIG. 3 only during cooling of the corresponding tempering sections at the sheet die.

The controlling method preferably applicable for sector heating is diagrammatically illustrated in FIG. 4 and that for sector cooling in FIG. 5.

In the method explained with reference to FIG. 3, the values $\bar{s}_x''$ represent the measure calculated from the mean thickness distributions $s_m$ for the respective correcting signal, the signs + or − for these values being important because they indicate whether heating or cooling of the tempering sections takes place.

In the methods explained with reference to FIGS. 4 and 5, the values $\bar{s}_x'''$ are a measure for the respective heating or cooling of the tempering sections.

As illustrated in FIG. 4, the mean thickness distribution ($x_F$) of measuring section "3" is the maximum thickness distribution ($\bar{s}_{xmax}'$). This distribution forms an extreme reference value for determining the correcting signals to be furnished the other correcting sectors or sections, with no correcting signal being provided the correcting sector associated with measuring section "3". The correcting signals for the other correcting sectors are formed by the respective departures ($\Delta \bar{s}_x$) of the mean thickness distributions of the associated film or measuring sections from the extreme reference value ($\Delta \bar{s}_x = \bar{s}_{xmax}' - \bar{s}_x'$). Similarly, FIG. 5 illustrates a method in which the minimum mean thickness distribution ($\bar{s}_{xmin}'$) is selected as an extreme reference value. The correcting sector or section associated with the measuring section having the minimum means thickness distribution (section "8" in FIG. 5) receives no correcting signal. The correcting signals for the other tempering or correcting sections are formed by the respective departures ($\Delta s_x$) of the mean thickness distributions of the associated film or measuring sections from the extreme reference value ($\Delta \bar{s}_x = s_{xmin}' - s_x'$).

I claim:

1. A method of controlling the thickness of flat films produced in flat film extruder installations or films coated in extruder laminating installations, said method comprising:

measuring thicknesses over the width of a flat film extruded from or coated by a sheet die and feeding the measured thicknesses to a processing unit;

subdividing the width of the flat film into equally long film sections ($x_F$) within the processing unit;

associating the film sections with correcting sections ($x_K$) of the sheet die from which they were extruded;

determining within the processing unit from the measurements of thicknesses mean thickness distributions ($\bar{s}_x'$) for the individual film sections ($x_F$); and selecting one of the mean thickness distributions ($\bar{s}_x'$) as a target value, the deviations of the values of the other mean thickness distributions ($\bar{s}_x'$) forming measures for correcting signals for setting elements of the individual correcting sections ($x_K$) at the sheet die that are associated with the respective film sections ($x_F$), adjustment of the setting elements controlling the film thicknesses.

2. A method according to claim 1, wherein one of the mean thickness distributions $s_x'$) selected as the target value has a maximum thickness distribution ($s_{xmax}'$) of the determined thickness distributions, and wherein the magnitudes of the correcting signals are related to the film section ($x_F$) with the maximum thickness distribution ($s_{xmax}'$) in such a way that the setting element associated with the film section having its mean thickness distribution selected as the target value receives no correcting signal and the correcting signals for the other setting elements are formed by the respective departure ($\Delta s_x$) of the mean thickness distribution of the associated film section from the maximum thickness distribution ($\Delta s_x = s_{xmax}' - s_x'$).

3. A method according to claim 1, wherein the one of the mean thickness distributions ($s_x'$) selected as the target value has a minimum thickness distribution ($s_{xmin}'$) of the determined thickness distributions, and wherein the magnitudes of the correcting signals are related to the film section ($x_F$) with the minimum thickness distribution ($s_{xmin}'$) in such a way that the setting element associated with the film section having its mean thickness distribution selected as the target value receives no correcting signal and the correcting signals for the other setting elements are formed by the respective departure ($\Delta s_x$) of the mean thickness distribution of the associated film section from the minimum thickness distribution ($\Delta s_x' = s_{xmin}' - s_x'$).

4. A method according to claim 1, wherein the setting elements are tempering units for changing the temperatures of the individual correcting sections ($x_K$) at the sheet die, said correcting sections being cooled when the measurement of the associated film section ($x_F$) shows a thick film portion and being heated when the measurement of the associated film section ($x_F$) shows a thin film portion.

5. A method according to claim 2, wherein the setting elements are tempering units for changing the temperatures of the individual correcting sections ($x_K$) at the sheet die, and tempering units being heated to adjust film thickness.

6. A method according to claim 3, wherein the setting elements are tempering units for changing the temperatures of the individual correcting sections ($x_K$) at the sheet die, said tempering units being cooled to adjust film thickness.

7. A method according to one of claims 4, 5, or 6, wherein, according to the mean thickness distributions ($s_x'$) measured and determined for the individual film sections ($x_F$), changes in the temperatures of the correcting sections ($x_K$) at the sheet die are effected in small steps.

* * * * *